Nov. 13, 1934.  R. J. LUSSE  1,980,867
AMUSEMENT CAR
Filed Oct. 16, 1933  3 Sheets-Sheet 1

Inventor:
Robert J. Lusse
by his Attorneys
Howson & Howson

Nov. 13, 1934.  R. J. LUSSE  1,980,867
AMUSEMENT CAR
Filed Oct. 16, 1933   3 Sheets-Sheet 2

Inventor:
Robert J. Lusse
by his Attorneys
Howson & Howson

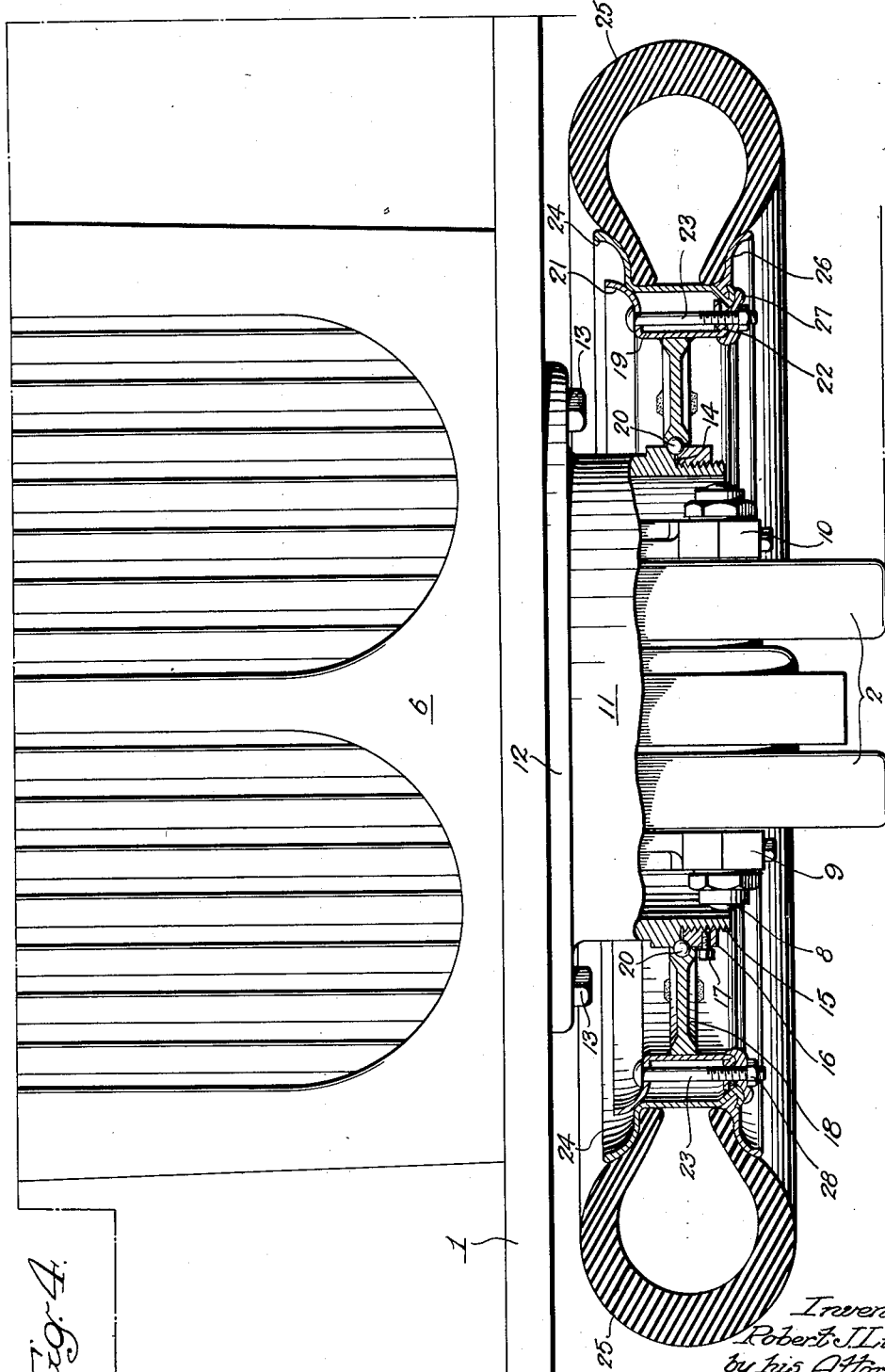

Patented Nov. 13, 1934

1,980,867

UNITED STATES PATENT OFFICE 1,980,867

AMUSEMENT CAR

Robert J. Lusse, Philadelphia, Pa., assignor to Lusse Brothers, Inc., Philadelphia, Pa., a corporation of Pennsylvania Application October 16, 1933, Serial No. 693,869

7 Claims. (Cl. 293—19)

This invention relates to new and useful improvements in vehicles such as are adapted for use in amusement parks and relates particularly to amusement cars of the type disclosed in U. S. Letters Patent No. 1,833,844 issued to Robert J. Lusse under date of November 24, 1931.

One object of the invention is to provide a vehicle of the general character set forth having a power-driven swivel wheel at the front end thereof so that said vehicle may be propelled and steered from the front end rather than the rear end.

Another object of the invention is to provide a vehicle of the character set forth having a fender at the front end thereof in the nature of a wheel operable to carry objects coming in contact therewith to one or the other sides of said vehicle.

A more specific object of the invention is to provide a device of the character described having a swivel wheel at the front end thereof for controlling the direction of the vehicle together with a bumper in the nature of a wheel arranged so that its axis of rotation is coincident with the swivel axis of said front or steering wheel.

The invention contemplates certain other objects and details of construction which are set forth hereinafter and shown in the accompanying drawings in which:

Fig. 4 is an enlarged fragmentary view partially in section on line 4—4, Fig. 3.

Figure 1:
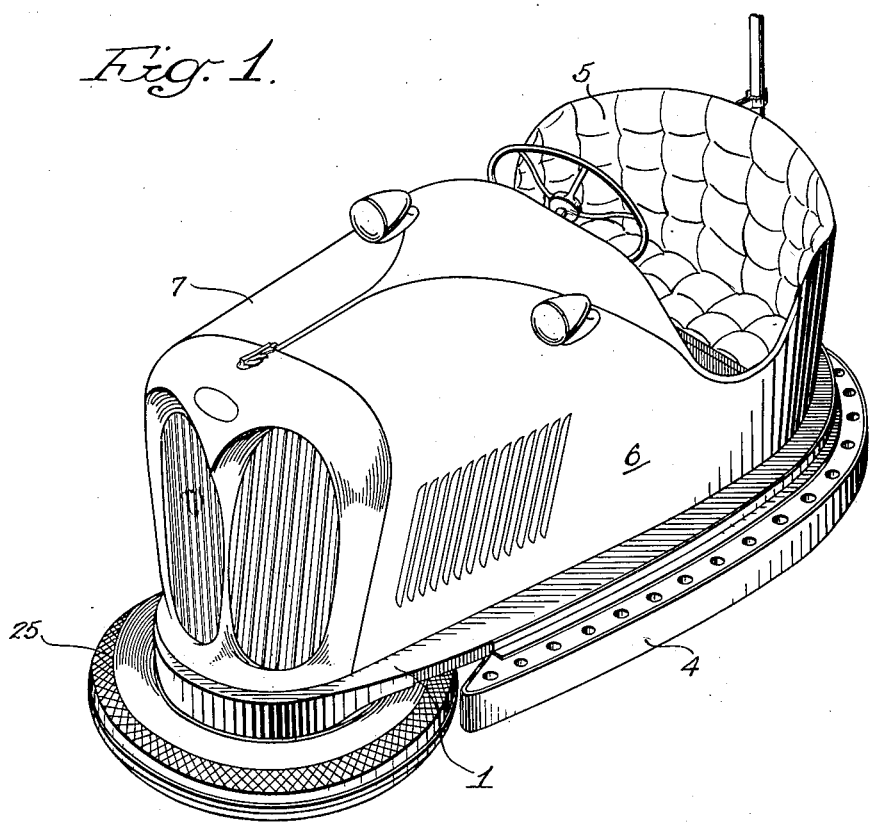
Fig. 1 is a view in perspective of a vehicle equipped with a bumper structure forming the subject of the present invention.
Figure 2:
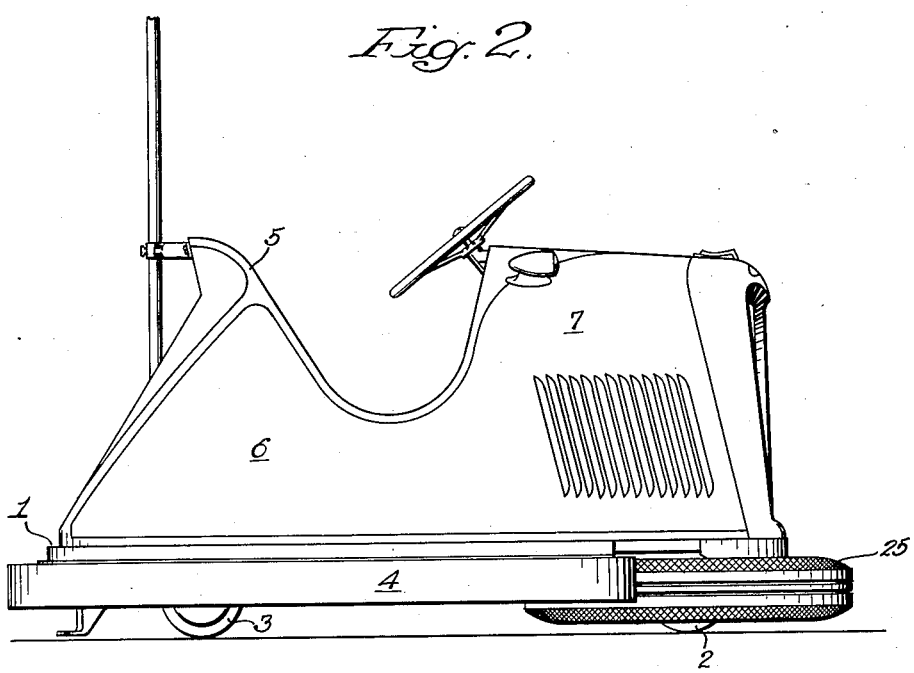
Fig. 2 is a view in side elevation of the disclosure in Fig. 1.
Figure 3:
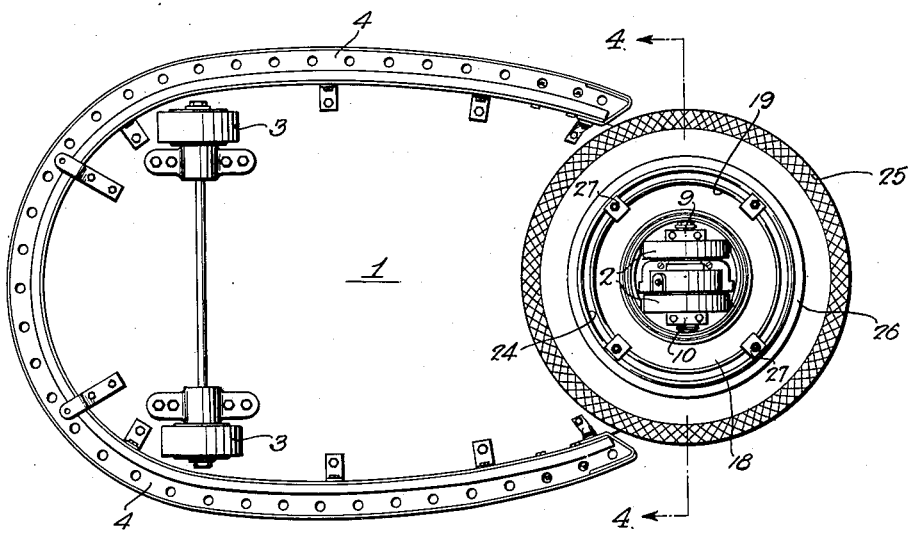
Fig. 3 is a view in plan of the bottom of the vehicle disclosed in Fig. 2.

Referring now particularly to the drawings, the amusement vehicle or car disclosed therein comprises broadly: a main horizontal platform 1 which is movably mounted in the front end on a steering wheel 2 and at the rear end on a pair of non-swiveling spaced supporting wheels 3; a shock absorbing bumper 4 extending about the platform 1 from points at the sides thereof adjacent the front end of the vehicle in the form of a horse-shoe as shown in Fig. 3, the detailed construction of which constitutes the subject matter of my prior U. S. Letters Patent No. 1,754,112 dated April 8, 1930, and No. 1,823,617 dated September 15, 1931 and assigned to Lusse Brothers, Inc.; a seat 5 supported at the rear end of a body 6 which includes a hood portion 7 mounted at the front end of the platform 1 and in which is contained steering mechanism including the swiveling wheel 2 for controlling the direction of movement of the car, and power operating means also connected to the wheel 2 whereby the car may be propelled.

In the present instance the wheel 2 is mounted on a horizontal shaft 8, the opposite end portions of which are journaled in depending arms 9 and 10 of a supporting member rotatably mounted with respect to the platform 1 substantially in the manner described in Patent No. 1,833,844, mentioned above.

In accordance with this invention a sleeve or annular collar 11 having a flange 12 at its upper end encircles the wheel 2 and its supporting means 9 and 10, and is secured to the underside of the platform 1 by means of bolts 13 so that the axis of said sleeve is coincident with the axis of swivel of the wheel 2. The lower external portion of the sleeve 11 is cut under as at 14 and provided with threads 15 to receive an annular retaining ring 16. The ring 16 is provided with a set screw 17 for locking said ring in any desired position circumferentially of the collar 11 as well as vertically with respect thereto within the extent of the threaded portion 15 thereof.

A wheel comprising a body portion in the form of an annular disk 18 and rim supporting member 19 is mounted for rotation about the sleeve 11 on bearings 20 disposed between said sleeve 11 and disk 18 in grooves formed respectively in each of said members, and the ring 16 is made adjustable on the sleeve 11 so that pressure on the bearings 20 may be regulated from time to time to compensate for play that may occur in the bearing assembly as a result of wear. The rim supporting element 19 in the present instance is provided with a diverging arcuate flange 21 at its upper edge and a substantially shorter horizontal flange 22 at the lower edge thereof, aligned pairs of openings being formed in said flanges at predetermined locations circumferentially of said member 19 for the reception of lug bolts 23 as shown in Fig. 4.

A rim 24 is mounted circumferentially of the supporting member 19 and a resilient cushion member 25 of substantially horse-shoe cross-section shape similar to a tire casing is mounted on said rim 24 and secured thereon by means of an annular split retaining ring 26. The ring 26 is held in place to retain the cushion 25 and rim 24 in predetermined relation with respect to the wheel by means of lugs 27. The end portions of the lugs 27 overlie the lower edges of the rim 24 and its support 19 respectively and are provided with apertures for lug bolts 23 on which are threaded retaining nuts 28 as shown in the drawings.

As will be noticed by reference to Fig. 3 of the drawings, the rotatable fender is disposed between and forwardly of the ends of the continuous bumper 4 which extends along the ends and sides of the vehicle platform 1, the rotatable fender being of such diameter that the circumference of the cushion will extend beyond the platform 1 so as to engage objects appearing in the path of travel of the vehicle. In the event of collision with another car or the fixed abutment around and defining the area in which a number of similar cars are operated will cause the car to roll or move laterally from the obstacle encountered. By mounting the fender to rotate about the swivel axis of the steering wheel at the front of the vehicle the same may be more easily controlled and guided from contact with the obstacle and in addition provides a simple compact arrangement thereof.

While a particular form of the invention has been disclosed it is obvious that the structural details of the wheel and cushion mounting may be modified without in any manner departing from the spirit of the invention.

What I claim is:

1. In a vehicle having at one end thereof a swivel wheel for controlling the direction of travel of said vehicle, a second wheel rotatably mounted about said swivel wheel and having its axis of rotation coincident with the swivel axis of said first wheel, and an annular cushion member mounted on said second wheel and having its periphery extending beyond the vehicle.

2. In a vehicle having at one end thereof a swivel steering wheel, a second wheel rotatably mounted about said first wheel and having its axis of rotation coincident with the swivel axis thereof, and an annular cushion member detachably mounted on said second wheel and having its periphery extending beyond the vehicle.

3. In a vehicle of the character described having at one end thereof a swivel wheel for controlling the direction of travel of said vehicle, a circular fender mounted for rotation about said swivel wheel and having its axis of rotation coincident with the swivel axis thereof.

4. In a vehicle of the character described having at one end thereof a swivel wheel for controlling the direction of travel of said vehicle, a sleeve surrounding said swivel wheel, said sleeve having its axis coincident with the axis of swivel of the wheel, and a circular fender mounted on said sleeve and arranged for rotation thereabout.

5. In a vehicle of the character described having at one end thereof a swivel wheel for controlling the direction of travel of said vehicle, a sleeve surrounding said swivel wheel and having its axis coincident with the swivel axis of the wheel, a second wheel rotatably mounted on said sleeve, and an annular cushion member mounted on the periphery of said wheel having its periphery extending beyond the vehicle.

6. In a vehicle of the character described having at one end thereof a swivel wheel for controlling the direction of travel of said vehicle, a sleeve surrounding said swivel wheel and having its axis coincident with the swivel axis of the wheel, a second wheel rotatably mounted on said sleeve, and an annular cushion member detachably mounted on the periphery of said wheel having its periphery extending beyond the vehicle.

7. In a vehicle of the character described having at one end thereof a swivel wheel for controlling the direction of travel of said vehicle, a sleeve and a circular fender mounted on said sleeve and arranged for rotation thereabout.

ROBERT J. LUSSE.